(12) United States Patent
Cronie

(10) Patent No.: US 11,362,820 B2
(45) Date of Patent: Jun. 14, 2022

(54) SHARED SECRET GENERATION

(71) Applicant: Nokia Technologies Oy, Espoo (FI)

(72) Inventor: Harm Cronie, Echallens (CH)

(73) Assignee: Nokia Technologies Oy, Espoo (FI)

( * ) Notice: Subject to any disclaimer, the term of this patent is extended or adjusted under 35 U.S.C. 154(b) by 143 days.

(21) Appl. No.: 16/879,546

(22) Filed: May 20, 2020

(65) Prior Publication Data

US 2020/0374115 A1 Nov. 26, 2020

(30) Foreign Application Priority Data

May 20, 2019 (EP) .................................... 19175455

(51) Int. Cl.
*H04L 9/08* (2006.01)

(52) U.S. Cl.
CPC .................................. *H04L 9/0872* (2013.01)

(58) Field of Classification Search
CPC ............. H04L 9/0872; H04L 2209/805; H04L 9/0866; G01L 5/00
See application file for complete search history.

(56) References Cited

U.S. PATENT DOCUMENTS

| | | | | |
|---|---|---|---|---|
| 6,233,339 B1 * | 5/2001 | Kawano | ........... | G06Q 20/40975 380/44 |
| 8,155,121 B2 | 4/2012 | Gudan et al. | | |
| 8,315,383 B2 * | 11/2012 | Seroussi | ................. | G06F 7/588 380/46 |
| 9,292,715 B2 * | 3/2016 | Ibrahim | ................... | G06F 21/82 |
| 9,467,850 B2 | 10/2016 | Deisher | | |
| 9,762,316 B2 | 9/2017 | Kukulski et al. | | |
| 2009/0079546 A1 * | 3/2009 | Beenau | .................. | G06Q 20/04 340/10.1 |
| 2010/0268949 A1 * | 10/2010 | Schuetze | ................ | H04L 9/002 713/168 |
| 2017/0093566 A1 | 3/2017 | Monni | | |
| 2017/0345230 A1 * | 11/2017 | Bill | ........................ | G07C 5/008 |
| 2018/0302387 A1 | 10/2018 | Zhang et al. | | |
| 2019/0149323 A1 | 5/2019 | Lawrenson et al. | | |
| 2019/0196588 A1 * | 6/2019 | Friedman | ........... | G06Q 30/0601 |
| 2019/0319786 A1 * | 10/2019 | Das | ....................... | H04W 12/03 |

OTHER PUBLICATIONS

Yao et al., "An ECG-Based Signal Key Establishment Protocol in Body Area Networks", 2010, IEEE, pp. 233-238. (Year: 2010).*

(Continued)

*Primary Examiner* — Matthew Smithers
(74) *Attorney, Agent, or Firm* — Laine IP Oy

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to receive from a pressure sensor matrix data describing a time-varying pressure interaction of the pressure sensor matrix with a second pressure sensor matrix, process the data to obtain a bit sequence, and use the bit sequence as a shared secret in a cryptographic procedure with a device.

15 Claims, 5 Drawing Sheets

(56) References Cited

OTHER PUBLICATIONS

Islam et al., "Wireless Sensor Network Reliability and Security in Factory Automation: A Survey", Nov. 2012, IEEE Transactions On Systems, Man, and Cybernetics—Part C: Applications and Reviews, vol. 42, No. 6, pp. 1243-1256. (Year: 2012).*
Lin et al., "Rhythmlink: Securely Pairing I/O-constrained Devices by Tapping", Proceedings of the 24th Annual ACM Symposium on User Interface Software and Technology, Oct. 2011, 9 pages.
Liu et al., "Overlapped-shaking: a Local Authentication Method for Mobile Applications", IEEE Computers, Communications and IT Applications Conference, Oct. 20-22, 2014, pp. 93-97.
Findling et al., "ShakeUnlock: Securely Unlock Mobile Devices by Shaking them Together", Proc. MoMM : 12th International Conference on Advances in Mobile Computing and Multimedia, Dec. 2014, 10 pages.
"3D Force Sensing Enables True Edge-to-Edge Mobile displays", ee News Europe, Retrieved on May 22, 2020, Webpage available at : https://www.eenewseurope.com/news/3d-force-sensing-enables-true-edge-edge-mobile-displays-0.
"A High-Performance Sensor for Touchscreens [Video]", Advanced Science News, Retrieved on May 22, 2020, Webpage available at : https://www.advancedsciencenews.com/a-high-performance-sensor-for-touchscreens-video/.
Yoo et al., "Industrial Grade, Bending-Insensitive, Transparent Nanoforce Touch Sensor via Enhanced Percolation Effect in a Hierarchical Nanocomposite Film", Advanced Functional Material, vol. 28, No. 42, Oct. 17, 2018, pp. 1-8.
"Is this the future of the iPhone? New sensor technology transforms entire display into a fingerprint scanner with FBI-levels of security, scientists claim", Daily Online Mail, Retrieved on May 22, 2020, Webpage available at: https://www.dailymail.co.uk/sciencetech/article-5910491/Smart-sensors-embedded-handsets-screen-read-fingerprint-touch.html.
Yin et al., "LISA: Maximizing RO PUF's Secret Extraction", IEEE International Symposium on Hardware-Oriented Security and Trust (HOST), 2010, pp. 100-105.
Extended European Search Report received for corresponding European Patent Application No. 19175455.5, dated Dec. 2, 2019, 7 pages.

* cited by examiner

SHARED SECRET GENERATION

FIELD

The present disclosure relates to the field of generating shared secrets.

BACKGROUND

To enable, for example, encrypted communication between two parties, a shared secret may be generated. Conventionally, a shared secret acting as an encryption key may be shared by providing it from one of the communicating parties to the other one of the parties using a suitable out-of-band method, such as a trusted courier. Once the parties have a shared secret, they may communicate with each other securely using a symmetric encryption algorithm, for example.

Alternatively to out-of-band methods, public key encryption or a Diffie-Hellman exchange may be used to establish a shared secret between two parties. Such methods do not require an out-of-band connection and may proceed quickly even when the parties are on different continents. Consequently, such methods have found broad application.

SUMMARY

According to a first aspect of the present disclosure, there is provided an apparatus comprising at least one processing core, at least one memory including computer program code, the at least one memory and the computer program code being configured to, with the at least one processing core, cause the apparatus at least to receive from a pressure sensor matrix data describing a time-varying pressure interaction of the pressure sensor matrix with a second pressure sensor matrix, process the data to obtain a bit sequence, and use the bit sequence as a shared secret in a cryptographic procedure with a device.

According to a second aspect of the present disclosure, there is provided a method comprising receiving, in an apparatus, from a pressure sensor matrix data describing a time-varying pressure interaction of the pressure sensor matrix with a second pressure sensor matrix, processing the data to obtain a bit sequence, and using the bit sequence as a shared secret in a cryptographic procedure with a device.

According to a third aspect of the present disclosure, there is provided an apparatus comprising means for receiving, in an apparatus, from a pressure sensor matrix data describing a time-varying pressure interaction of the pressure sensor matrix with a second pressure sensor matrix, means for processing the data to obtain a bit sequence, and means for using the bit sequence as a shared secret in a cryptographic procedure with a device.

According to a fourth aspect of the present disclosure, there is provided a non-transitory computer readable medium having stored thereon a set of computer readable instructions that, when executed by at least one processor, cause an apparatus to at least receive from a pressure sensor matrix data describing a time-varying pressure interaction of the pressure sensor matrix with a second pressure sensor matrix, process the data to obtain a bit sequence, and use the bit sequence as a shared secret in a cryptographic procedure with a device.

According to a fifth aspect of the present disclosure, there is provided a computer program configured to cause, when run, an apparatus to at least receive from a pressure sensor matrix data describing a time-varying pressure interaction of the pressure sensor matrix with a second pressure sensor matrix, process the data to obtain a bit sequence, and use the bit sequence as a shared secret in a cryptographic procedure with a device.

EMBODIMENTS

Pressure patterns are obtained in devices with pressure sensor matrices which are pressed against each other. As the pressure sensor matrices are pressed against each other, they will record similar pressure data from this interaction, and the data is used in the generation of a shared secret between the devices. The shared secret may be subsequently used in cryptographic procedures between the devices, such as authentication and/or encryption/decryption processes.

Figure 1:
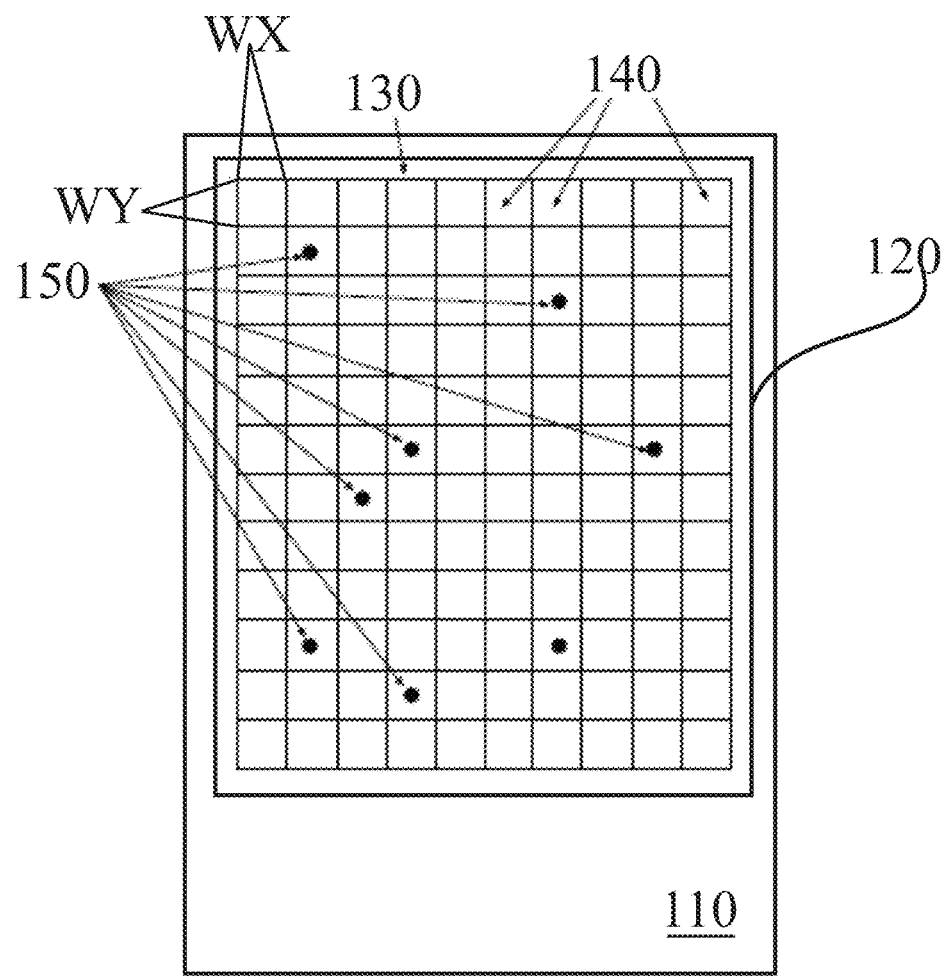
FIG. 1 illustrates an example device in accordance with at least some embodiments of the present invention.

FIG. 1 illustrates an example device in accordance with at least some embodiments of the present invention. Illustrated is device 110, which may comprise a smartphone, a tablet computer, a key dongle, a smart watch, an Internet of Things, IoT, node or, indeed, another kind of suitable electronic device. Device 110 comprises a pressure sensor 120, which may comprise a touch screen display or, alternatively, a pressure sensor without a display function. The pressure sensor comprises a pressure sensor matrix 130 comprised of a plurality of pressure sensor elements 140, as illustrated. The sensor matrix 130 may comprise, for example, 20, 100, 256 or 1024 pressure sensor elements in a direction, such that the number of sensor elements 140 need not be the same in both directions. The number of sensor elements is not the same in both directions in the example of FIG. 1, for example. For example, there may be 100 by 256 sensor elements in the sensor matrix 130.

Spatial dimensions of one pressure sensor element along the surface of the pressure sensor matrix are WX by WY, as illustrated. The pressure sensor elements may be configured to measure the presence of pressure, and a strength of the pressure, that is, the sensor elements are able to measure a magnitude of a force exerted on their area by a pressure interaction. For example, the sensor elements may be configured to measure the force based on a change of electrical resistivity caused by the force, the extent of change in the resistivity being a function of the magnitude of the force.

Assuming two devices such as device 110 are pressed against each other such that their pressure sensor matrices 130 are pressed against each other, the pressure sensors will record pressure data, that is, data describing a time-varying pressure interaction of the pressure sensor matrix 130 with a second pressure sensor matrix of the other device.

As the matrices 130 are pressed against each other, they record the same pressure interaction to produce pressure data. Further, owing to Newton's $3^{rd}$ law, according to which all forces between two objects exist in equal magnitude and opposite direction, the force patterns exerted against the devices are identical. The pressure interaction will be characterized by random elements, such as flecks of dust pressed between the pressure sensor matrices and random unintended curvature of the pressure sensors. The unintended curvatures may be relics of manufacturing imprecision, for example. Device 110 is configured to process the pressure data to obtain from it a bit sequence, the bit sequence being based on characteristics of the pressure data. The bit sequence, which may be processed further, may then be used by device 110 as a shared secret with the other device participating in the pressure interaction, in cryptographic procedures. In some embodiments, one or both of the devices participating in the pressure interaction may provide their respective pressure data or bit sequence to a further node, the further node then using the bit sequence in the cryptographic procedures. In such cases, the device and node may be seen as a distributed system or apparatus.

In terms of FIG. 1, the pressure data may comprise, for example, a list of sensor element 140 identifiers and force values these sensor elements 140 record. Alternatively, the pressure data may simply comprise the force values in an order which enables determining which sensor element each force value originates in. For example, the pressure data may comprise data from those sensor elements 140 which record pressure over a threshold pressure value, which may be pre-configured or dynamically set in connection with the pressure interaction. When dynamically set, the threshold may be set to a 20% or 30% of the highest recorded force, for example. In the illustrated example, sensor elements 150 record a force which exceeds the threshold. The identifiers may be used in determining the respective locations in sensor matrix 130 of those sensor elements 150 which provide information into the pressure data. The locations may be expressed in terms of Cartesian indices to the matrix, for example. Device 110 can convert these into absolute metrics as device 110 may know dimensions XW and XY, including inter-sensor element gaps. The sensor matrix may have an element size of 4 or 6 square millimeters, for example. This device 110 may be enabled to determine distances between sensor elements 150 in terms of millimeters or centimeters, for example. These distances will be the same in the other device participating in the pressure interaction.

The pressure data may further be time-varying in the sense that it comprises for the sensor elements 150 more than one separate force value, the more than one force value being measured at more than one time instant, the time instants being comprised in an overall time duration of the pressure interaction. The pressure data may be sub-divided into time slots, for example. Such dividing into time slots may comprise dynamically dividing the pressure interaction into a pre-set number of time slots, such as four, six or eight, for example. The time slots may be of equal duration.

In general, the apparatus, such as a processor or processing core(s) processing the pressure, data do not need to be comprised in the same physical device as sensor matrix 130, although this may be the case where the device 110 comprises a smartphone, for example. Where they are not comprised in the same device, the system may be considered to be the distributed system or apparatus mentioned above.

The processing of the pressure data may comprise quantization of at least one aspect of the pressure data. For example, a distance between two sensor elements measuring the two largest forces may be quantized into a set number of bits, to facilitate processing of the pressure data and in eliminating the effect of having pressure sensor matrices of different make participating in the pressure interaction. Alternatively or additionally, distances, such as the distance between the two sensor elements measuring the two largest forces, may be converted to an absolute measure, such a centimeters or millimeters. Quantizing the distance between two sensor elements measuring the largest forces is an example of quantizing a spatial dimension of the pressure sensor matrix.

Alternatively or in addition to quantizing a spatial aspect, the pressure, that is, force values themselves, may be quantized to facilitate their processing. Further, sensor elements 140 of sensor matrix 130 may be spatially aggregated into a lower number of virtual sensors, such that physical sensor elements 140 are assigned to virtual sensors, thus resulting in a lower number of the virtual sensors to work with, compared to the number of physical sensor elements. One example of sensor element aggregation is defining a set of virtual pixels of a predetermined size. The pressure value measured by the virtual pixels may be the aggregation, that is, the sum, of pressure values measured by the underlying physical sensor elements. Such aggregation may be interpreted as a decimation of the spatial pressure values such that both devices operate with pressure signals that are measured over areas of equal size. It may be assumed that such decimation is applied where a device has K×L virtual pixels. The actual number of real sensor elements participating in the virtual pixels depends on the array size of the pressure sensor array and the physical dimensions of the sensor elements. Hence K and L may be different for different devices, but a virtual pixel size may be set to a predefined area of A. A reasonable value for A could be, for instance, 4 mm2.

As the randomness of the pressure data may stem partially from manufacturing imprecision, algorithmic tools developed for physical unclonable function, PUF, handling may find application in the presently disclosed technology. For example, the LISA algorithm described by Daniel Chi-En and Qu Gang in their publication "LISA: Maximizing RO PUF's secret extraction" (2010 IEEE International Symposium on Hardware-Oriented Security and Trust (HOST)) may be used.

The processing of the pressure data to obtain the bit sequence may comprise identifying two largest pressure values in the data, and obtaining bits of the bit sequence based on a distance between the two largest pressure values on the sensor matrix and/or based on magnitudes of the two largest pressure values. In detail, the bit sequence, being a sequence of individual bits, may be constructed of bits extracted from various aspects of the pressure data. Some bits may be extracted from the pressure data from a distance between the two highest force values in the pressure data, which may be quantized. Other bits may be extracted from the two highest force values themselves, which may likewise be suitably quantized. In some embodiments, both the magnitudes and the distance are used. As long as both devices use the same process in extracting the bits, the resulting bit sequences will be the same, and thus usable as the shared secret.

More bits may be extracted using the third-largest pressure value and the fourth-largest pressure values, likewise from the distance between these sensor elements and/or the pressure value magnitudes themselves. More broadly, the measured pressure values may be arranged in a descending sequence of magnitude, and pairs may be formed of the pressure values, the pairs being usable in deriving bits into the bit sequence based on the distance between the members of the pairs and/or the magnitudes of the pressure values.

The number of extracted bits may be increased by the afore-mentioned division into time slots, as each time slot may have separate largest pressure magnitudes and distances. Thus using two time slots may already double the number of extracted bits compared to an embodiment which does not divide the data into time slots. Likewise, four time slots may produce twice the number of extractable bits as the two-time slot case. For the bits in different time slots to be genuinely different, the pressure interaction needs to be genuinely time-varying in nature, as otherwise the time slots have, at least partly, the same data, which does not produce genuinely random new bits. Users may enhance the time-varying nature of the pressure interaction by rotating or sliding the devices against each other as they are pressed against each other, for example.

The cryptographic procedure may comprise an authentication procedure or operation of an encryption algorithm, for example. As an example of an authentication procedure, the shared secret may be used to authenticate the other device by sending a randomly generated nonce to the other device and receiving a response from the other device. The authentication may be checked by verifying that the other node has, to produce the response, hashed the nonce together with the shared secret, or that the other node has encrypted the nonce using the shared secret as key, for example. As an example of operation of an encryption algorithm, the shared secret may be used as a key of a symmetric encryption algorithm employed in securing contents of communication between the two devices.

Figure 2A:
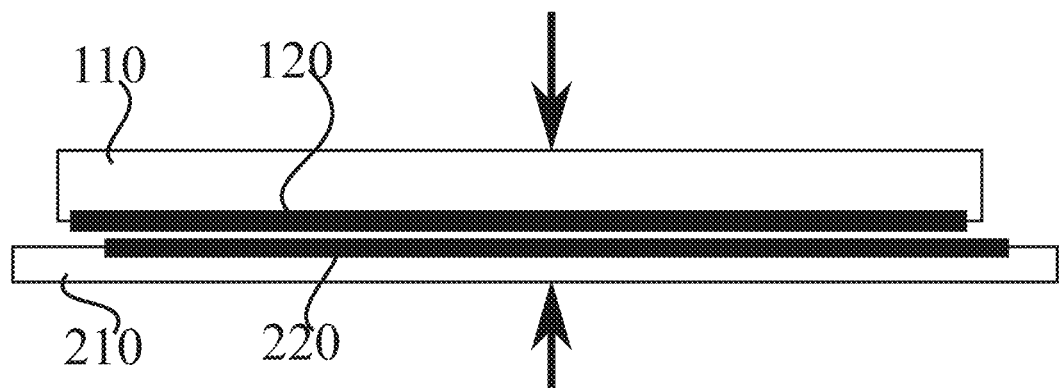
FIG. 2A illustrated a pressure interaction between two devices.

FIG. 2A illustrates a pressure interaction between two devices. Device 110 corresponds to device 110 of FIG. 1, which comprises pressure sensor 120, as described herein above. Device 210 is another device, comprising pressure sensor 210, which is pressed against device 110 to generate the pressure data for bit sequence generation. The pressure pressing the devices together is illustrated in FIG. 2A with black arrows.

Figure 2B:
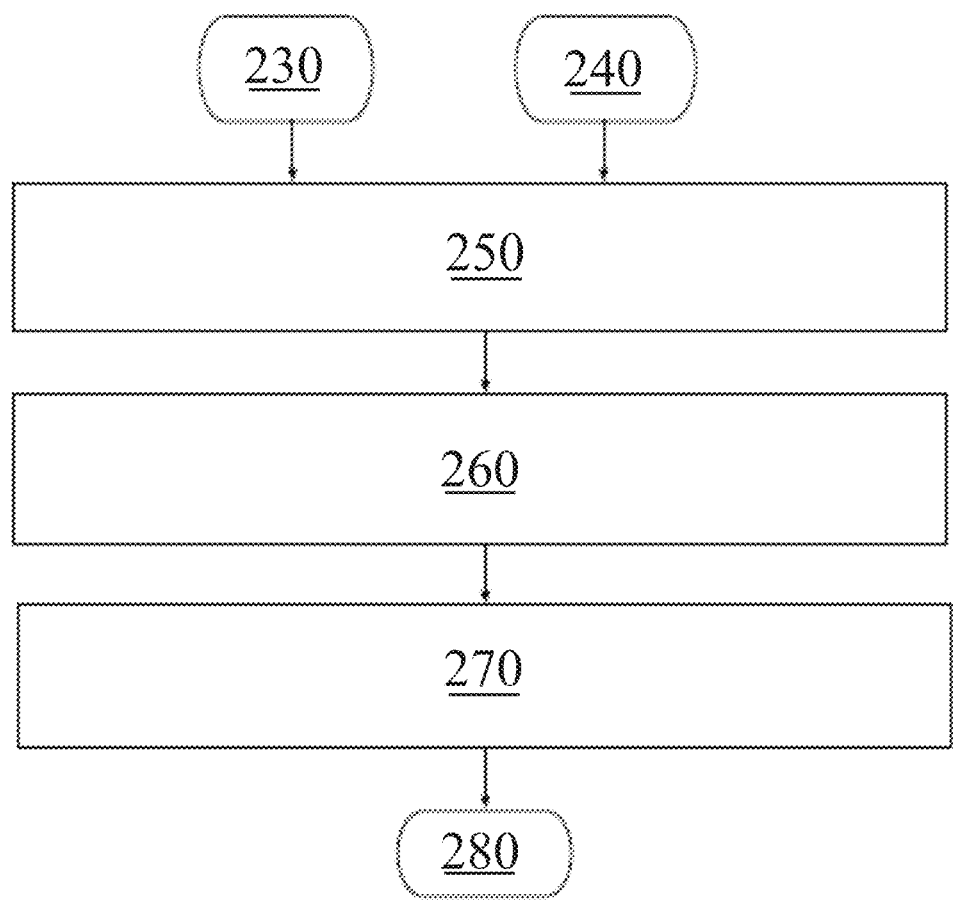
FIG. 2B is a flow graph of a method in accordance with at least some embodiments of the present invention.

FIG. 2B is a flow graph of an example method in accordance with at least some embodiments of the present invention.

Inputs to the process of FIG. 2B are dimensions M, N in phase 230 which define the geometry of the pressure sensor array. Furthermore, two parameters th and T define a pressure threshold and duration in milliseconds, respectively, in phase 240. The threshold th may be defined as a relatively small fraction, such as 2% or 20% of the maximum pressure that is measurable by a pressure sensor element. The duration or time interval T may be in the range of 10-100 or 10-1000 milliseconds, for example.

In phase 250, a secret extraction period is started once the pressure measured from at least one of the sensor elements in the pressure sensor array exceeds the threshold th for a duration of at least T milliseconds. The secret extraction period may correspond to the overall time duration of the pressure interaction. In phase 260, a pressure signal s[i,j] is recorded for each of signals where i and j index the rows and columns of the pressure sensor array, respectively. For instance, i and j may take values in [0,M−1] and [0, N−1], respectively.

In phase 270, the recording process and secret extraction period is terminated when the pressure level measured across all sensor elements in the array is below the threshold th for at least T milliseconds. The result is a set of M×N pressure signals that have been recorded over a secret extraction period, phase 280. This corresponds to the pressure data.

Figure 3:
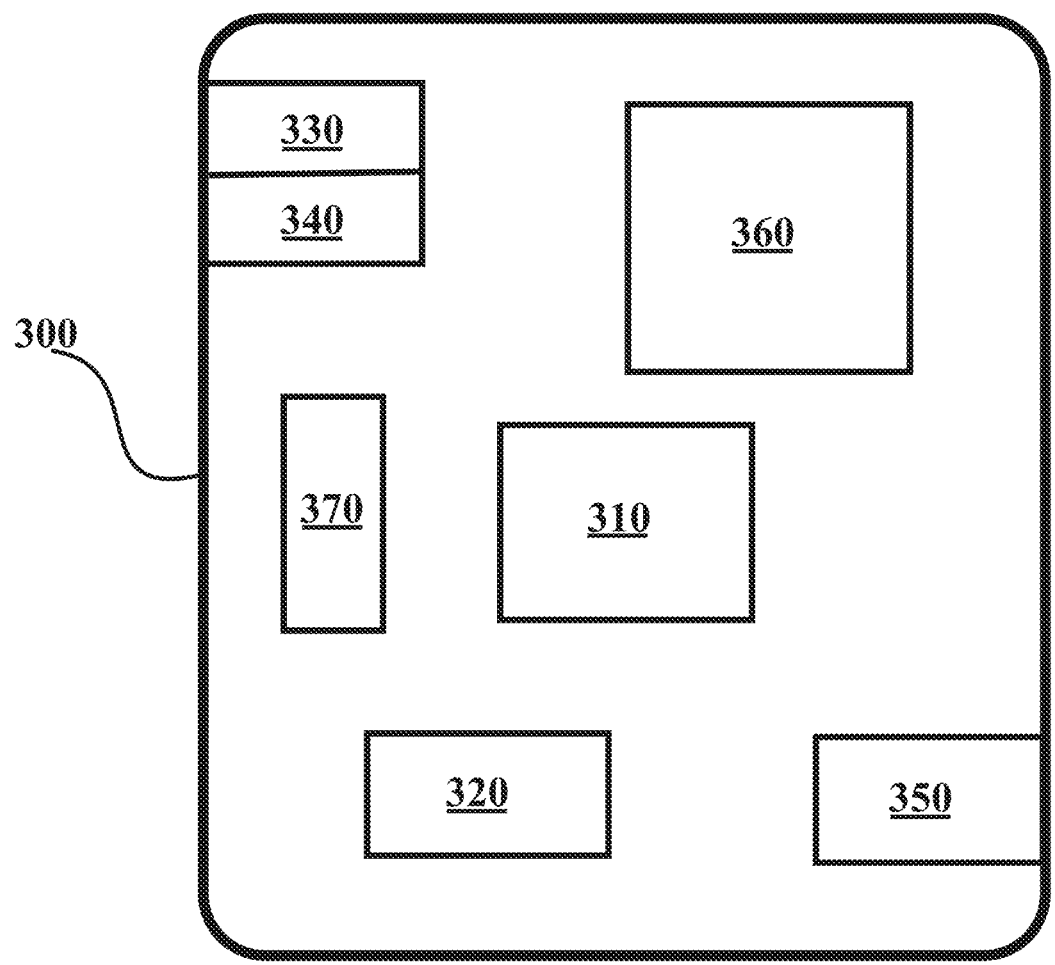
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310, when suitably programmed, may be means for performing actions in device 300. Such actions may comprise, for example, receiving pressure sensor data, processing such data, and using a bit sequence as a shared secret in a cryptographic procedure. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to initiate cryptographic procedures, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. An example of such a further device is the pressure sensor illustrated in FIG. 1. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack an NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
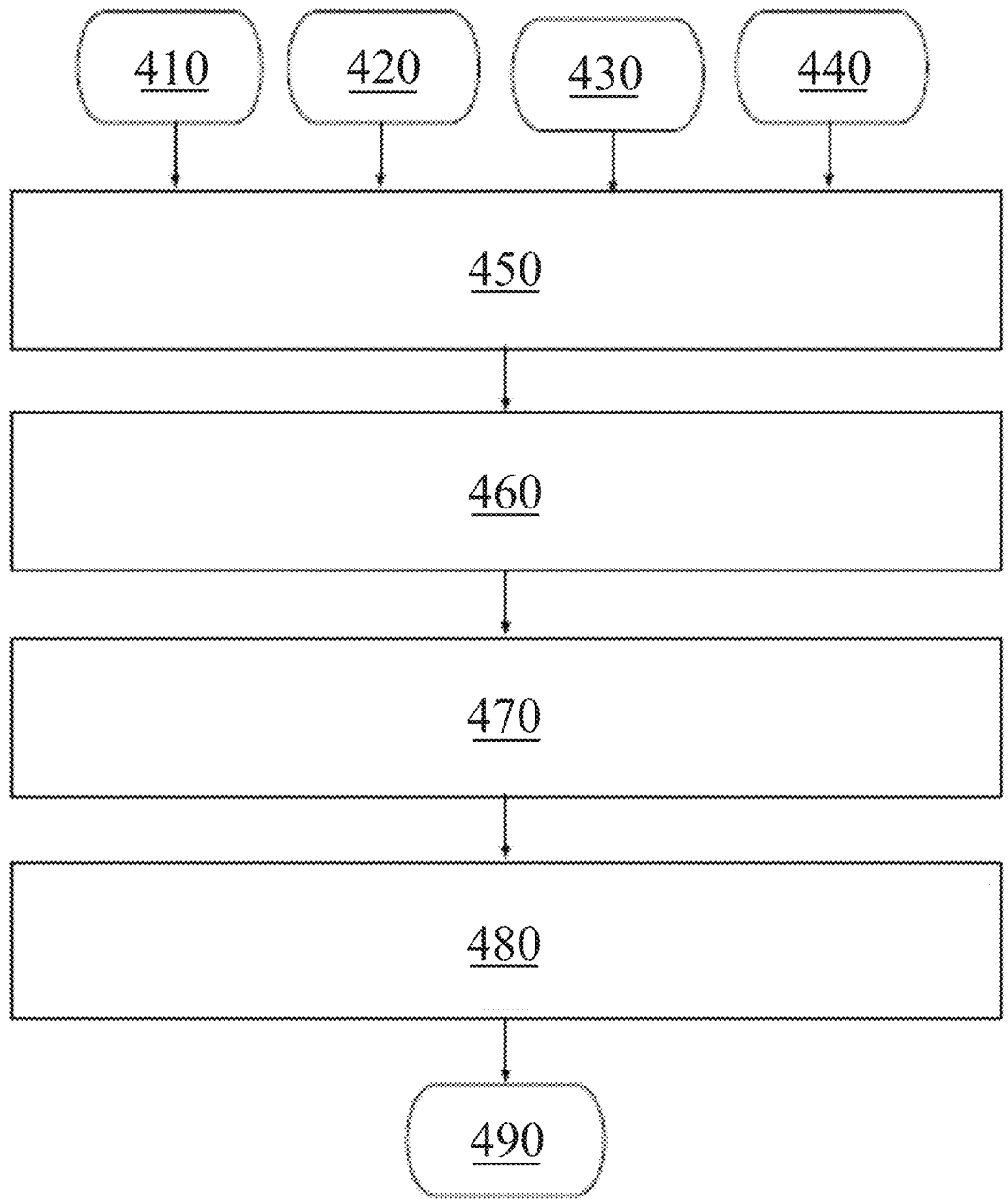
FIG. 4 is a flow graph of a method in accordance with at least some embodiments of the present invention.

FIG. 4 is a flow graph of a method in accordance with at least some embodiments of the present invention. Inputs of the process are the size of the pressure sensor array K, L once the measured signals have been normalized, phase 410. Further inputs 420 are the number of time slots N the measured signals are divided into and the duration of the secret extraction period Td. A parameter d is also an input to the process in 430 and denotes the number of bits that are extracted from each of the N time slots the measured pressure signals are divided into. The measured pressure signals s[i,j](t) itself are input to the process in 440.

In phase 450 of the process, each of the signals from the pressure sensor are divided into N equal temporal parts of duration Td/N. These parts may be denoted by s[i, j, k](t) where i and j denote the index of the sensor element in the pressure sensor array and k indexes the temporal part where k runs from 0 to N−1.

In phase 460 of the process an average pressure value over time is computed for each sensor element of the pressure sensor array and each time slot of the measured pressure signals. Such average value may be denoted by s[i, j, k].

In phase 470 of the process, the two largest measured pressure values across the array are determined for each time slot k of the measured pressure signals resulting in two pairs of indices (i1, j1) and (i2, j2) and corresponding largest pressure values p1 and p2. Note that these indices and pressure values are specific to the actual time slot k. The indices (i1, j1) and (i2, j2) correspond to the sensor element in the pressure sensor array where the average pressure values are measured during time slot k.

In phase 480 of the process, a set of bits is extracted from the indices corresponding to the largest average pressure values by quantizing the Euclidean distance between the corresponding sensor elements in the array into d bits. Note that this distance is the same for both devices that participate in the secret extraction. The quantization itself may be relative to a predetermined distance l0. For instance, if the distance between (i1, i2) and (i2, j2) is equal to l, the extracted bits may be based on a quantization into 2d values of the quantity l/l0. The value of l0 may be chosen as for instance the largest display size that could participate in the secret extraction. A reasonable value for l0 would be for instance 30 cm. Additionally, one or both of the average pressure values p0 and p1 may be quantized also and the resulting bits concatenated to the results of quantizing (i1, i2) and (i2, j2). Furthermore, additional bits may be generated by including e.g. the third and fourth largest average values into the process.

The final shared secret b is the output of the process in phase 490 where b may be formed by concatenating all bits extracted for each of the N time slots. In other embodiments, other processes may be used to extract shared secrets from the measured pressure data. Results known in the extraction of bits from physical unclonable functions, PUFs, may be useful here. An example is the extraction of bits from PUFs by the LISA algorithm, mentioned above.

Figure 5:
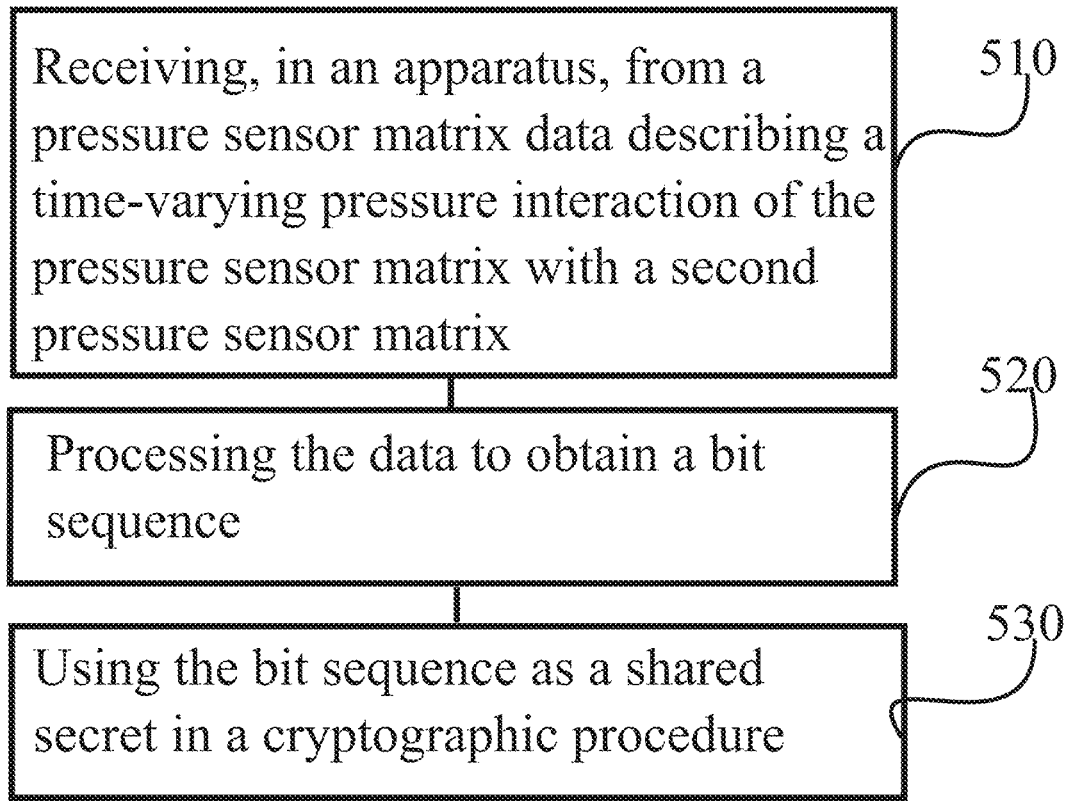
FIG. 5 is a flow graph of a method in accordance with at least some embodiments of the present invention.

FIG. 5 is a flow graph of a method in accordance with at least some embodiments of the present invention. The phases of the illustrated method may be performed in device 110, an auxiliary device or a personal computer, for example, or in a control device configured to control the functioning thereof, when installed therein.

Phase 510 comprises receiving, in an apparatus, from a pressure sensor matrix data describing a time-varying pressure interaction of the pressure sensor matrix with a second pressure sensor matrix. The data may comprise pressure data, as described herein above. Phase 520 comprises processing the data to obtain a bit sequence. Finally, phase 530 comprises using the bit sequence as a shared secret in a cryptographic procedure with a device.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in improving communication and/or device security.

The invention claimed is:

1. An apparatus comprising,
at least one processor;
and at least one memory comprising computer program code for one or more programs, the at least one memory and the computer program code configured to, with the at least one processor, cause the apparatus to perform at least the following:
receive, in an apparatus, from a pressure sensor matrix, data describing a time-varying pressure interaction wherein the pressure sensor matrix is pressed against a second pressure sensor matrix;
process the data to obtain a bit sequence, and
use the bit sequence as a shared secret in a cryptographic procedure with a device.

2. The apparatus according to claim 1, wherein the processing to obtain the bit sequence is further caused to identify two largest pressure values in the data, and obtain bits of the bit sequence based on a distance between the two largest pressure values on the sensor matrix and/or based on magnitudes of the two largest pressure values.

3. The apparatus according to claim 2, wherein the processing further caused to divide the data into time slots, and obtain bits of the bit sequence from more than one of the time slots separately.

4. The apparatus according to claim 3, wherein the apparatus is further caused to perform the dividing into time slots by dividing a duration of the time-varying pressure interaction into equally long time periods.

5. The apparatus according to claim 1, wherein the processing is further caused to quantize at least one aspect of the data.

6. The apparatus according to claim 5, wherein the quantizing is further caused to quantize a spatial dimension of the pressure sensor matrix.

7. The apparatus according to claim 5, wherein the quantizing is further caused to quantize at least one pressure value in the data, to indicate a force of a pressure on at least one sensor element comprised in the pressure sensor matrix.

8. The apparatus according to claim 1, wherein the apparatus is further configured to perform the processing of the data at least in part by aggregating sensor elements of the pressure sensor matrix into larger aggregate pixels which comprise plural physical pressure sensor elements.

9. The apparatus according to claim 8, wherein a size of the aggregate pixels is 4 square millimetres.

10. The apparatus according to claim 1, wherein the cryptographic procedure comprises an authentication procedure or operation of an encryption algorithm.

11. A method comprising:
receiving, in an apparatus, from a pressure sensor matrix, data describing a time-varying pressure interaction wherein the pressure sensor matrix is pressed against a second pressure sensor matrix;
processing the data to obtain a bit sequence, and
using the bit sequence as a shared secret in a cryptographic procedure with a device.

12. The method according to claim 11, wherein the processing to obtain the bit sequence further comprises identifying two largest pressure values in the data, and obtaining bits of the bit sequence based on a distance between the two largest pressure values on the sensor matrix and/or based on magnitudes of the two largest pressure values.

13. The method according to claim 12, wherein the processing further comprises dividing the data into time slots, and obtaining bits of the bit sequence from more than one of the time slots separately.

14. The method according to claim 13, wherein the method further comprises performing the dividing into time slots by dividing a duration of the time-varying pressure interaction into equally long time periods.

15. A non-transitory computer readable medium comprising a computer program configured to cause, when run, an apparatus to at least:
receive, from a pressure sensor matrix, data describing a time-varying pressure interaction, wherein the pressure sensor matrix is pressed against a second pressure sensor matrix;
process the data to obtain a bit sequence, and
use the bit sequence as a shared secret in a cryptographic procedure with a device.

* * * * *